United States Patent
Mannherz et al.

[15] 3,695,104
[45] Oct. 3, 1972

[54] ELECTROMAGNETIC FLOWMETER HAVING REMOVABLE LINER

[72] Inventors: Elmer D. Mannherz, Southampton; Henry M. Hermanns, Huntingdon Valley, both of Pa.

[73] Assignee: Fischer & Porter Co., Warminster, Pa.

[22] Filed: May 28, 1971

[21] Appl. No.: 147,827

[52] U.S. Cl. ..............................73/194 EM, 138/140
[51] Int. Cl. ..............................G01f 1/00, G01p 5/08
[58] Field of Search...........73/194 EM; 138/140, 147

[56] References Cited

UNITED STATES PATENTS

| 2,088,922 | 8/1937 | Porteous | 138/140 X |
| 3,334,518 | 8/1967 | Miyamichi | 73/194 EM |

FOREIGN PATENTS OR APPLICATIONS

| 187,344 | 2/1967 | U.S.S.R. | 73/194 EM |

*Primary Examiner*—Charles A. Ruehl
*Attorney*—Michael Ebert

[57] ABSTRACT

An electromagnetic flowmeter having a meter pipe of magnetic material terminating at either end in a coupling flange. Coils are disposed within the pipe to establish an electromagnetic field which is mutually perpendicular to the longitudinal axis of the pipe and to a diametrical axis extending between a pair of electrodes mounted on the pipe. Telescopically insertable within the pipe is a replaceable liner assembly including a relatively rigid sleeve of non-magnetic material having a flange at only one end thereof which, when the sleeve is inserted, abuts the face of the corresponding flange in the meter pipe. Concentrically disposed within the sleeve is a tubular liner of resilient insulating material. The liner is provided at one end with a first flange abutting the face of the sleeve flange, and a second flange at the other end thereof, which when the assembly is in place, is adapted to abut the face of the corresponding pipe flange. The liner is bonded to the inner wall of said sleeve except at the end portion thereof which includes said second flange, whereby by temporarily collapsing the unbonded portion of the liner, the assembly may be readily telescoped within the pipe.

9 Claims, 7 Drawing Figures

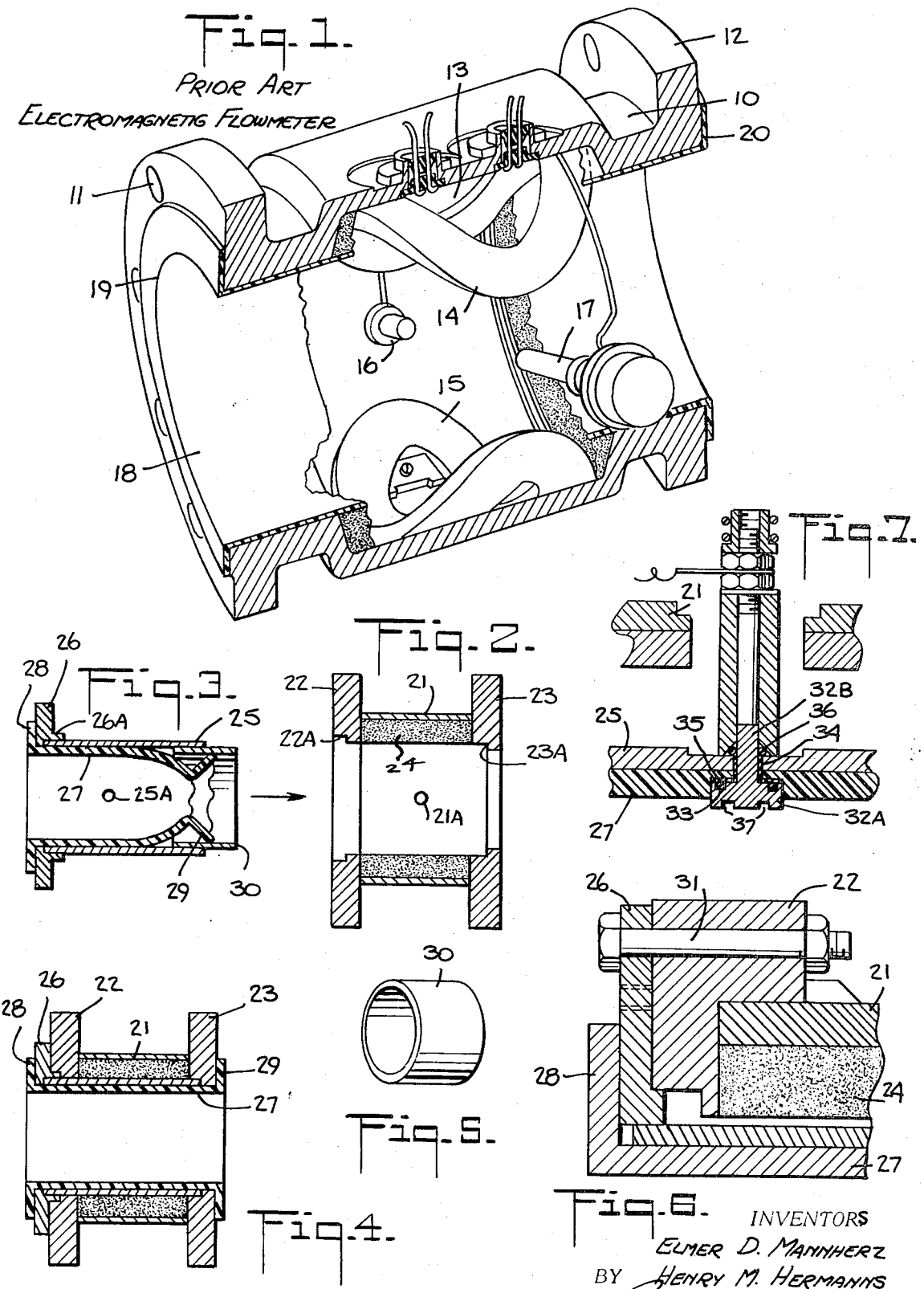

ELECTROMAGNETIC FLOWMETER HAVING REMOVABLE LINER

BACKGROUND OF THE INVENTION

This invention relates generally to electromagnetic flowmeters, and in particular to a replaceable liner assembly for a magnetic flowmeter.

The magnetic flowmeter is adapted to measure volume rates of those fluids which present difficult handling problems, such as corrosive acids, sewage, slurries, detergents, and the like. In a magnetic flowmeter, a uniformly distributed magnetic field is generated which is mutually perpendicular to the longitudinal axis of the meter pipe through which the fluid flows and to the axis of the meter electrodes. Since the velocity of the fluid is directed along the longitudinal axis of the pipe, the voltage induced within the fluid will be perpendicular to both the velocity of this fluid and the flux linkages of the magnetic field. Thus the metered fluid constitutes a series of fluid conductors moving through the magnetic field. The more rapid is the rate of flow, the greater the instantaneous value of the voltage established at the electrodes.

One well-known flowmeter which is in widespread commercial use, makes use of a flanged stainless steel pipe section, the inner wall of the pipe and the flange surfaces being lined with an insulating material. Two electrodes are mounted at diametrically opposed positions on the central portion of the pipe section, the electrodes being completely insulated from the pipe by bushings. The end surfaces of the electrodes are flush with the inner surface of the insulating liner and come in contact with the fluid to be metered. A field coil assembly is provided consisting of two saddle-shaped magnet coils surrounded by a box-shaped laminated iron core, which in turn completely encompasses the central portion of the flowmeter. The field coil assembly is designed to produce a linear and uniform magnetic field through the metering section.

The instantaneous voltage developed across the meter electrodes represents the average fluid velocity of the flow profile passing the electrodes at a given moment, and the flowmeter will produce an output signal equal to a continuous average flow rate regardless of whether the flow profile is laminar or turbulent. The flowmeter output signal is linearly proportional to the volumetric rate of flow through it.

It has heretofore been the practice to provide insulating liners fabricated of Teflon, neoprene, rubber or vitreous enamel, depending on the anticipated nature of the fluid to be measured. While such liner materials are satisfactory for many fluids, in those instances in which the flowmeter is intended to measure the flow rate of fluids which are highly corrosive, the liner may fail after a fairly short period of operation. Moreover, the fluids may contain abrasive particles of various sizes tending to score or mutilate the liner, making it necessary to replace the liner.

Thus in an installation having a conventional magnetic flowmeter, when the insulating liner is worn away or degraded by abrasive particles or by other properties of the fluid being measured, the present practice is to return the flowmeter to the factory for disassembly, repair and relining. This procedure has obvious disadvantages, for not only is it time-consuming and costly, but it also makes it necessary either to shut down the process or to substitute for the flowmeter undergoing repair, a temporary replacement.

SUMMARY OF THE INVENTION

In view of the foregoing, it is the main object of this invention to provide an electromagnetic flowmeter which incorporates a replaceable liner assembly, whereby a worn or defective liner may be removed and quickly replaced on the job site.

More specifically, it is an object of the invention to provide a replaceable liner assembly insertable in a flanged meter pipe and constituted by a non-magnetic sleeve of relatively rigid material having a flange at one end only, and a tubular liner of resilient material concentrically disposed within the sleeve, the liner having a first flange at one end which abuts the corresponding sleeve flange, and a second flange at the other end which, when the assembly is in place, is adapted to abut the corresponding flange of the meter pipe.

The salient advantage of a liner assembly in accordance with the invention is that it may be quickly removed from the meter on the job site and replaced by a fresh assembly, so that little operating time is lost, thereby obviating the need to return the entire meter to the factory for liner replacement and avoiding the expenses entailed in a factory replacement procedure.

Briefly stated these objects are attained in a flowmeter having a meter pipe of magnetic material, terminating at either end in a coupling flange, whereby the meter pipe may be interposed in a line conducting a fluid to be measured. Coils are interposed within the pipe to establish an electromagnetic field therein which is mutually perpendicular to the longitudinal axis of the pipe (the direction of fluid flow), and to a diametrical axis extending between a pair of electrodes mounted on the meter pipe.

Telescopically insertable within the pipe is a replaceable liner assembly including a relatively rigid sleeve of non-magnetic material, which covers the coils in the pipe but in no way interferes with the magnetic field established thereby, the sleeve having a flange at only one end thereof which, when the sleeve is fully inserted in the pipe, abuts the corresponding pipe flange.

Concentrically disposed within the sleeve is a tubular liner of resilient insulating material having a first flange at one end thereof abutting the face of the sleeve flange, and having a second flange at the other end which, when the assembly is in place, is adapted to abut the face of the corresponding pipe flange. The liner is bonded to the inner wall of the sleeve, except at the end portion thereof which includes the second flange, whereby by temporarily collapsing said unbonded portion of the liner, the assembly may be readily telescoped within the pipe.

OUTLINE OF THE DRAWING

For a better understanding of the invention as well as other objects and further features thereof, reference is made to the following detailed description to be read in conjunction with the accompanying drawing, wherein:

FIG. 1 is a cut-away perspective view of an electromagnetic flowmeter of a prior-art type;

FIG. 2 illustrates in longitudinal section the meter body of a flowmeter in accordance with the invention;

FIG. 3 is a sectional view of a replaceable liner assembly in accordance with the invention, which assembly is telescopable within the meter body shown in FIG. 2;

FIG. 4 shows, in section, the liner assembly inserted in the meter body;

FIG. 5 is a perspective view of the tool used to effect insertion of the assembly in the meter body;

FIG. 6 is an enlarged section of a portion of the inserted liner assembly and meter body; and FIG. 7 illustrates, in section, one electrode in a flowmeter incorporating the liner assembly.

DESCRIPTION OF THE INVENTION

Referring now to FIG. 1, there is shown a prior-art electromagnetic flowmeter which when modified in the manner to be described, is adapted to receive a liner assembly in accordance with the invention. The meter includes a generally cylindrical pipe 10, serving as the meter body. Pipe 10 is provided at either end with annular flanges 11 and 12, whereby the meter may be interposed in a pipe line conducting a fluid to be measured.

Disposed within a cylindrical recess 13 formed within the meter body are a pair of saddle-shaped electromagnetic coils 14 and 15 which are embedded in a potting compound. In practice this compound may be a filled mixture of an epoxy-based material. The coils act to establish a magnetic field extending at right angles to the diametrical axis passing through a pair of electrodes 16 and 17 connected to the output terminals of the meter.

The interior of the pipe is lined with a tubular liner 18 of polyurethane, Teflon, neoprene or rubber, terminating at either end in flanges 19 and 20 which abut the faces of body flanges 11 and 12, respectively.

In other known forms of flowmeters, the magnetic field coils are placed outside of the meter body. However in the meter design shown in FIG. 1, the coils 14 and 15 which generate the magnetic field, lie within the meter body, which being of magnetic material (steel), perform the core function of the iron laminations previously required, thereby effecting a marked reduction in the size and weight of the meter.

A meter of the type shown in FIG. 1 operates efficiently as long as the liner is in good condition, but when liner 18 is degraded by abrasive particles or by other properties of the fluid being measured, it is necessary to return the meter to the factory in order to replace the defective liner. The present invention makes it possible to quickly replace the liner on the job site.

In a meter according to the invention, the meter body as shown in FIG. 2, is constituted by a cylindrical pipe section 21 of magnetic material having a flange 22 secured to one end thereof and a flange 23 secured to the other end thereof. The inner diameters of the flanges are smaller than that of the pipe section 21, thereby defining an annular channel to accommodate the coils and potting compound 24. Flange 22 is provided with an annular step 22A which is displaced outwardly relative to the cylindrical inner surface of potting compound 24, whereas flange 23 is provided with an annular step 23A which is inwardly displaced relative to said inner surfaces.

In practice, annular step 23A may be defined by a removable ring which is adapted to fit into a circular groove in the flange. This allows more room for the insertion of the collapsed end of the liner assembly. The ring is slipped over the collapsed end after the liner assembly is in place.

Telescopically receivable within the meter body is a liner assembly in accordance with the invention. This assembly, as shown in FIG. 3 consists of a cylindrical metal sleeve 25 of non-magnetic material such as aluminum or stainless steel, having a metal flange 26 secured to only one end thereof. Flange 26 is provided with a shoulder 26A which nests within step 22A on flange 22 when the line assembly is in place, whereas the flange-free end of sleeve 25 is accommodated within step 23A of flange 23 of the meter body. Thus when the sleeve is inserted, it is snugly socketed within the meter body.

Disposed concentrically within sleeve 25 is a tubular liner 27 having a flange 28 at one end thereof, which abuts the face of sleeve flange 26 and is bonded thereto, the other end of liner 27 having a flange 29 formed thereon that is adapted to lie against the face of meter body flange 23 when the liner assembly is in place.

Liner 27 is composed of polyurethane or any other suitable resilient material having good electrical insulating properties, such as Teflon. The liner is bonded to the inner wall of sleeve 25, except in the end portion thereof which includes flange 29.

In order to be able to insert the liner assembly within the meter body, it is necessary to collapse the end portion of the liner, for otherwise liner flange 29 will prevent insertion through the body passage. For this purpose, a tool is useful. The tool is in the form of a ring 30 which is dimensioned to slide within the flange-free end of sleeve 25 and to collapse the end portion of the liner, so that when the ring 30 is pushed into the sleeve, the flange 29 of the liner is compressed within the ring, thereby making it possible to telescope the liner assembly within the meter body. Once the liner assembly is inserted, ring 30 is withdrawn and the collapsed liner flange 29 is free to snap out against the face of body flange 23.

When the liner assembly is fully inserted in the meter body, it is held thereto by means of bolts 31 which pass through registered bores in assembly flange 26 and body flange 22 as shown in FIG. 6. Should it thereafter become necessary to replace the liner assembly on the job site, these bolts are taken out, the electrodes are removed, and the assembly is then pulled out without difficulty.

Meter body 21 and the liner assembly are each provided with a pair of registered apertures at diametrically opposed positions, one meter body aperture 21A being shown in FIG. 2, and one assembly aperture 25A being shown in FIG. 3. These apertures accommodate the meter electrodes which are inserted therein from the inside of the assembly.

Thus, as shown in FIG. 7, the electrode 32 is provided with a head portion 32A and a shank portion 32B, the head portion resting within a recess formed in liner 27 and being provided at its inner face with an O-ring 33 or flat gasket 35 to seal the electrode and to prevent fluid seepage into the bore receiving the electrode. Shank 32B passes through metal sleeve 25 and is insulated therefrom by a bushing 34. An O-ring seal 36 is located above bushing 34.

Electrode head 32A is provided with two holes 37 for a spanner wrench so that the electrode can be prevented from rotating when tightening the nut. These holes can also be used to indicate the amount of head material being worn away.

While there has been shown and described a preferred embodiment of an electromagnetic flowmeter having a removable liner in accordance with the invention, it will be appreciated that many changes and modifications may be made therein without, however, departing from the essential spirit of the invention. Thus instead of having electrodes whose heads protrude from the liner, the liner may be provided with recessed seats molded therein to accommodate the heads so that only the faces thereof would be exposed, thereby minimizing erosion of the heads. Or the electrodes may be in the form of metal discs or buttons embedded in the liner with only the faces exposed, in which event instead of electrode stems, wires would be connected directly to the buttons.

We claim:

1. In combination with an electromagnetic flowmeter having a pipe provided at either end with a coupling flange, a replaceable liner assembly comprising:
   A. a sleeve of relatively rigid non-magnetic material, having a flange at only one end thereof which when the assembly is inserted, lies against the corresponding flange on the pipe, and
   B. a tubular liner of resilient insulating material concentrically disposed within said sleeve, said liner having a first flange which abuts the flange of the sleeve and a second flange adapted to abut the corresponding flange on the pipe, said liner being bonded to said sleeve except at the end portion thereof which includes said second flange, whereby the end portion may be collapsed to permit insertion of the assembly in said pipe.

2. A liner assembly as set forth in claim 1, wherein said liner is formed of polyurethane.

3. A liner assembly as set forth in claim 1 wherein said sleeve is formed of stainless steel.

4. A liner assembly as set forth in claim 1, wherein said sleeve is formed of aluminum.

5. A flowmeter combination as set forth in claim 1, further including as assembling ring insertable in said sleeve to effect collapse of said end portion.

6. An electromagnetic flowmeter comprising:
   A. a pipe of magnetic material having coupling flanges on either end thereof to define between said flanges an annular channel;
   B. coils disposed in said annular channel to establish an electromagnetic field at right angles to the longitudinal axis of the pipe;
   C. a pair of electrodes disposed at diametrically opposed positions on said pipe; and
   D. a replaceable liner assembly telescopable within said pipe, said assembly being constituted by a sleeve of non-magnetic material having a flange only at one end thereof, which when the sleeve is inserted, lies against the corresponding pipe flange, and a tubular liner of resilient insulating material concentrically disposed within said sleeve, said liner having a first flange at one end which lies against the sleeve flange, and a second flange at the other end adapted to lie against the corresponding pipe flange, said liner being bonded to said sleeve except at the end portion which includes the second flange whereby the end portion may be collapsed to permit entry of the assembly in said pipe.

7. A flowmeter as set forth in claim 6, wherein said sleeve is formed of stainless steel.

8. A flowmeter as set forth in claim 6, wherein said liner is formed of polyurethane.

9. A flowmeter as set forth in claim 6, wherein said electrodes are provided with heads embedded in or recessed in said liner whereby only the faces thereof are exposed to fluid.

* * * * *